United States Patent [19]

Kwoka et al.

[11] Patent Number: 4,989,687
[45] Date of Patent: Feb. 5, 1991

[54] VISCOUS SHEAR COUPLINGS

[75] Inventors: Georg Kwoka, Sieburg; Herbert Taureg, Hennef, both of Fed. Rep. of Germany

[73] Assignee: Viscodrive GmbH, Lohmar, Fed. Rep. of Germany

[21] Appl. No.: 376,310

[22] Filed: Jul. 6, 1989

[30] Foreign Application Priority Data

Jul. 8, 1988 [DE] Fed. Rep. of Germany ....... 3823180
Aug. 22, 1988 [DE] Fed. Rep. of Germany ....... 3828422

[51] Int. Cl.$^5$ .................. B60K 17/348; F16D 33/20
[52] U.S. Cl. .................................. 180/248; 192/58 B; 192/58 C; 475/85; 475/87
[58] Field of Search .................. 180/233, 248, 249; 192/58 B, 58 C; 74/710.5, 711

[56] References Cited

U.S. PATENT DOCUMENTS

| 3,760,922 | 9/1973 | Rolt et al. ................... 180/251 X |
| 4,048,872 | 9/1977 | Webb ........................... 180/248 X |
| 4,290,510 | 9/1981 | Warren ..................... 192/107 M X |
| 4,605,087 | 8/1986 | Ashauer et al. ............... 180/233 X |
| 4,650,028 | 3/1987 | Eastman et al. ................ 180/233 |
| 4,846,299 | 7/1989 | Wiese et al. .................... 180/248 |
| 4,885,957 | 12/1989 | Taureg et al. ................ 180/248 X |

FOREIGN PATENT DOCUMENTS 0068309  1/1983  European Pat. Off. .
3828421  3/1989  Fed. Rep. of Germany .... 192/58 B Primary Examiner—Charles A. Marmor
Assistant Examiner—Mitchell Bompey
Attorney, Agent, or Firm—Toren, McGeady & Associates

[57] ABSTRACT

A viscous shear coupling comprises a housing and a hub rotatable within the housing. Plates are splined to the housing and plates to the hub, there is a pair of plates splined to the hub between each two adjacent plates splined to the housing. The plates in pairs splined to the hub have convergent apertures therein, each aperture converging in a direction away from that radial face of the plate which is adjacent to the other plate of the pair.

20 Claims, 5 Drawing Sheets

VISCOUS SHEAR COUPLINGS

BACKGROUND TO THE INVENTION

1. Field of the Invention

This invention relates to viscous shear couplings. Such assemblies find particular, but not exclusive, use in the drive transmissions of motor vehicles.

2. Description of Prior Art

A viscous shear coupling, as described for example in United Kingdom Patent Specification No. 1,357,106 (and corresponding U.S. Pat. No. 3,760,922 issued 25th Sept. 1973) comprises a housing part, a hub part within the housing part, the parts being relatively rotatable about a common axis, and two sets of interleaved plates. The plates are planar and provided with slots and/or holes and the plates carried by the hub part alternate with those carried by the housing part. The plates of one of the sets are rotatable with the housing part and the plates of the other set are rotatable with the hub part. The plates of one of the sets are axially movable into contact with the plates of the other set. The housing part contains a viscous liquid such, for example, as a silicone oil.

The specifications also show a coupling associated with an inter-axle differential gear in a four-wheel drive vehicle.

Normally torque is transmitted between the housing part and the hub part due to shearing forces in the viscous liquid between adjacent plates, i.e. in viscous mode. The above patent specifications describe that the housing part may be filled with viscous liquid, e.g. a silicone oil, to a fill factor which leaves part of the housing normally filled with air or gas.

Such couplings exhibit a phenomenon which has come to be known as the "hump" mode in which the plates of the two sets come into contact and torque is transmitted by metallic friction which may be accompanied by shearing of the liquid between the plates.

Prolonged slipping of the coupling in "viscous mode" causes heating and expansion of the silicone oil. When the oil has expanded to fill the entire space within the coupling and all the air or gas has been dissolved in the oil there is a sharp increase in pressure in the coupling and, due to the throttling effect between adjacent plates, the movable plates of the one set are moved into contact with the plates of the other set by the fluid pressure in the coupling.

The movement of the movable plates is due to the fact that these plates do not normally remain in a central position between two fixed plates. Thus there is a wider and a narrower gap at the respective sides of a movable plate. As a result of the throttling effect, the pressure increases more rapidly in the larger gaps so that the movable plates move towards the nearer adjacent fixed plates.

When a movable plate contacts a fixed plate, frictional forces are developed so that the coupling operates in a dual mode, i.e. on the one hand the viscous liquid is sheared and on the other hand there is a frictional contact between the plates so that the coupling tends to act as a friction clutch.

This hump effect acts to protect the coupling against overloading since in this condition it is able to transmit more torque than it could in the viscous mode because of the friction clutching effect.

In the hump mode, the viscous fluid can cool down until the coupling then resumes torque transmission in the viscous mode.

If the coupling is used in a limited-slip differential gear of a motor vehicle then, if an obstacle is encountered, considerable torque can be transmitted for a short time in the hump mode to overcome the obstacle.

In the prior art couplings as described above, the plates carried by the hub part and by the housing part alternate and thus when the coupling is in the hump mode a movable plate engages on one side of a fixed plate. Due to the pressures involved, it has been found that the fixed plates may distort or "dish". This distortion may be permanent and can prevent the plates contacting one another effectively in the hump mode and due to the distortion may even prevent the movable plates moving at all.

SUMMARY OF THE INVENTION

It is an object of the present invention to provide a coupling in which torque transmission in the hump mode is improved and this is effected without distortion of the plates.

According to the invention, therefore, we provide a viscous shear coupling comprising; a housing forming a first coupling part, a hub mounted within the housing for rotation relative to the housing about an axis and forming a second coupling part, a viscous liquid in the housing, two sets of annular plates in the housing, each plate having an inner and an outer periphery, each plate being bounded by radial faces and having a radial dimension defined between said peripheries, the plates of the two sets being mounted on and rotatable with the housing and with the hub respectively, and being interleaved so that a pair of plates of one of said sets is located between each two adjacent plates of the other of said sets, the plates of said one set being axially movable with respect to the coupling part on which they are mounted and each having apertures therein opening into said radial faces and defined at least partly by sides which extend across said radial dimension and converge in a direction away from that radial face of the plate which is adjacent to the other plate of the said pair.

This arrangement has several advantages over the prior art. Firstly, during relative rotation between the plates of the two sets the fluid tends to move from the gaps between adjacent plates of the two sets into the gaps between each pair of plates of the one set and this assists in moving the plates of each pair apart.

Secondly, in the hump mode, each plate of the other set is located between two plates of the one set and is thus supported on both sides so that deformation of the plates of the other set does not occur.

Thirdly, since each plate of the other set is engaged by two plates of the one set, the frictional coupling forces between the plates is increased thus to increase the torque transfer while preventing distortion of the plates.

Fourthly, since the apertures are defined by edges which converge, the reaction force of the viscous fluid on the converging edges helps to move the plates of the one set to engage the plates of the other set as hump mode is approached.

In one arrangement, the convergent edges of the apertures are rounded or bevelled. In another, and preferred arrangement, the convergent edges of each aperture are formed by portions of the plate alongside the aperture which have been bent to project from a radial face of the plate. The bent edges produce a greater hydro-dynamic force on the movable plates than with the rounded or bevelled edges and thus the plates of the one set are moved more effectively towards the plates of the other set as hump mode is approached. In this arrangement the plates of the other set are planar.

The plates of the other set may be spaced at a defined distance from one another or all plates of both sets may be movable.

The bent edges act efficiently to sweep off the viscous liquid from the planar faces of the other plates and thus there is a sealed area between the bent edges and the two plates so that friction contact can occur between the plates efficiently. The part of each plate of the one set between the bent edges may deform into contact with the adjacent plate of the other set thus to improve the sealing and prevent the ingress of viscous fluid.

It has already been proposed in DE-PS 36 32 283 to have apertures in plates for viscous couplings which have thickened edges. However in this arrangement the hydro-dynamic effects balance out on each side of the plates so that there is no net force tending to move the plate as in the present invention.

Preferably, the through apertures are in the form of circumferentially-spaced slots.

The apertures in the respective plates of each pair, when viewed parallel to said axis are preferably mutually offset and out of alignment which ensures a rapid escape of viscous fluid from the gaps between adjacent plates of the two sets. Alternatively, the apertures in the respective plates of each pair may be mutually aligned.

Preferably, the projection of said edges from the said radial face is between 10% and 30% of the spacing between adjacent plates of the coupling when the spacing between each pair of adjacent plates in the housing is equal.

Preferably the plates are provided with a wear-resistant coating which may be a nitride or carbonitride coating.

The coupling may be combined with a differential gear such that the housing is connected to one element of the gear and the hub is connected to another element of the gear so that the coupling parts are relatively rotated upon relative rotation of said elements thus to control the differential action of the gear.

The invention also includes a motor vehicle comprising a prime mover, road wheels and a drive line between the prime mover and at least some of the road wheels and wherein a coupling or a combination of a coupling and a differential gear as described is inserted in the drive line of the vehicle.

BRIEF DESCRIPTION OF THE DRAWINGS

The invention will now be described in detail by way of example with reference to the accompanying drawings in which.

DESCRIPTION OF PREFERRED EMBODIMENTS

Figure 1:
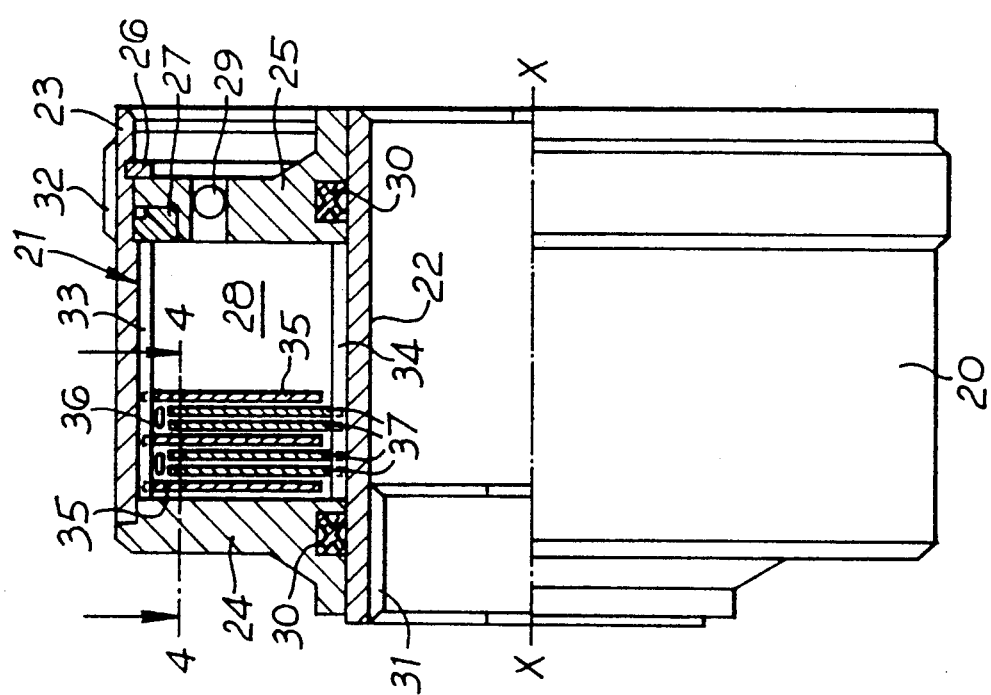
FIG. 1 is a half section through a coupling constituting a first embodiment of the invention.

Referring now to FIG. 1 the coupling is indicated generally at 20 and comprises a housing 21 and a hub 22 which is rotatable within the housing.

The housing comprises a cylindrical casing 23 having an end plate 24 which is welded thereto and a further end plate 25 which is releasably held in position by a circlip 26 and is sealed to the casing by a seal 27. The space 28 within the housing contains a viscous liquid, e.g. a silicone oil and may be filled through a filling device 29. The hub 22 is sealed to the housing by running seals 30 and is internally splined at 31 for engagement by a driving or driven member. The housing has external splines 32 for connection to a driving or driven member.

Within the housing are two sets of interleaved plates. The plates are in the form of annular discs and are generally planar. The housing 21 is internally splined at 33 and the hub is externally splined at 34. One set of plates, some of which are indicated at 35, are splined to the housing and will hereinafter be referred to as outer plates. The adjacent outer plates are spaced apart by spacer rings 36. Between each adjacent pair of outer plates there is a pair of inner plates some of which are indicated at 37. These inner plates are splined to the hub.

If relative rotation occurs between the housing 21 and the hub 22 a torque is transmitted between them due to the shearing forces in the oil between the plates. Continued relative movement causes the silicone oil to increase in temperature and thus there is an increase in pressure within the housing with the dissolution of the gas or air therein in the oil. Due to the fact that the plates may be considered to be a labyrinth seal there is throttling between the plates. What then happens is that the plates of each pair of inner plates 37 move apart and approach the adjacent outer plates 35 between which they are located. As the pressure increases further the coupling goes into hump mode as described above in which there is frictional engagement between the inner and outer plates; it will be seen from FIG. 1 that each outer plate 35 will be sandwiched between two inner plates 37. Each outer plate 35 will thus, in the hump mode, be prevented from being distorted since it has a plate 37 on each side thereof. Moreover the frictional forces between the inner and outer plates are increased as compared with the prior art arrangement where there is a single inner plate between each adjacent pair of outer plates.

Figure 2:
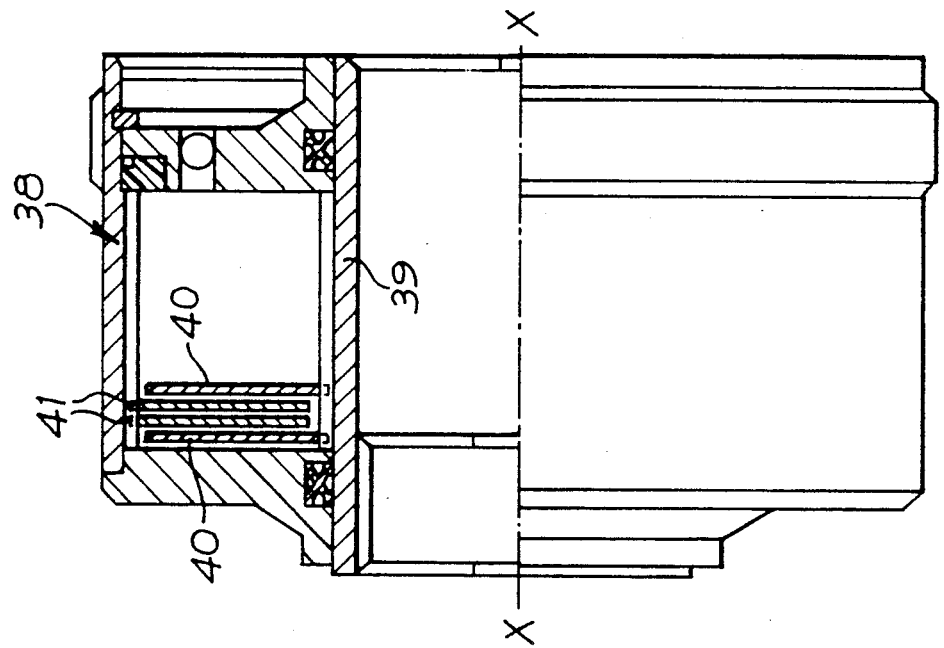
FIG. 2 is a half section through a coupling constituting a second embodiment of the invention.

FIG. 2 shows a coupling which is in all essential respects identical to that of FIG. 1 except that there are pairs of outer plates between each adjacent pair of inner plates. Thus the coupling of FIG. 2 comprises a housing 38 and a hub 39 which is rotatable therein. Two adjacent inner plates are indicated at 40 and are splined to the hub whereas between each adjacent pair of inner plates 40 is a pair of outer plates 41. The operation of the coupling is as described in relation to FIG. 1 except that in approaching the hump mode the plates 41 move apart into engagement with the plates 40.

In each of FIGS. 1 and 2 the hub of the coupling is rotatable relative to the housing about an axis indicated at X—X.

Figure 3:
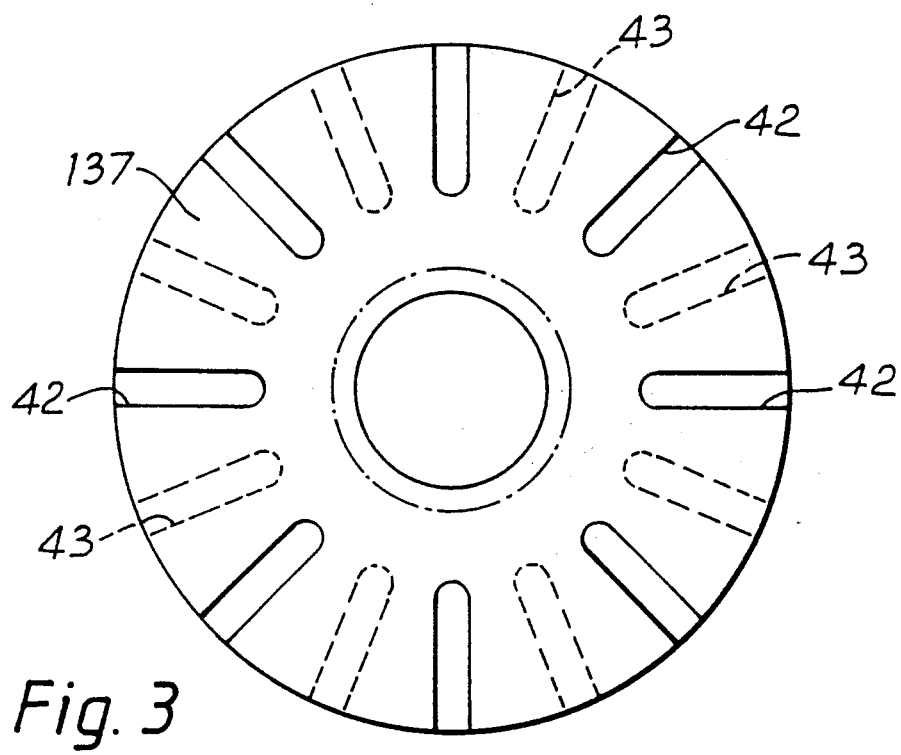
FIG. 3 is a diagram illustrating the arrangements of slots in the two plates of a coupling.
Figure 4:
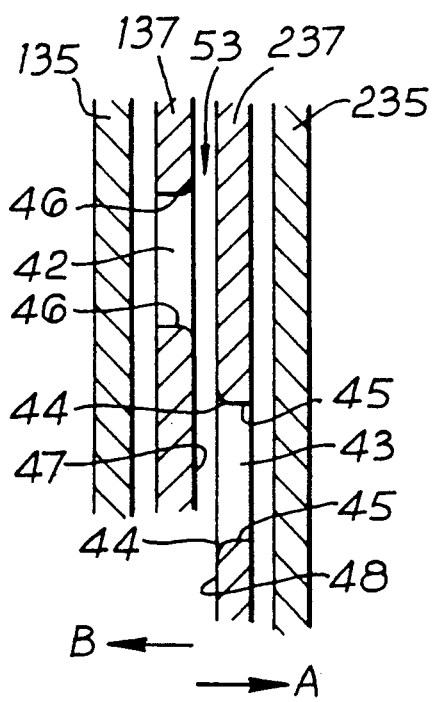
FIG. 4 is a detail section on a line 4—4 of FIG. 1.
Figure 5:
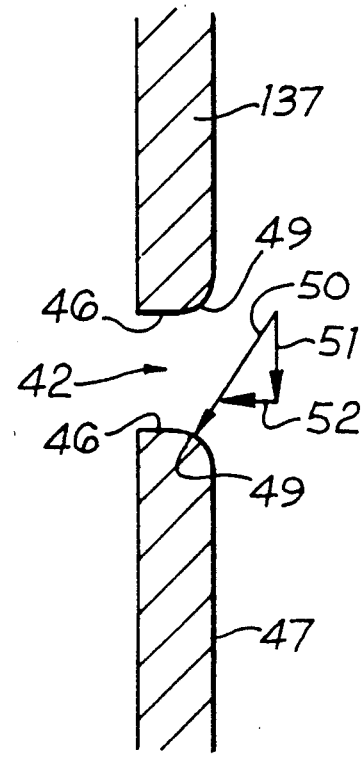
FIG. 5 is a diagram illustrating the hydro-dynamic force on the plates in operation.

Referring now to FIGS. 3 to 5, the inner and outer plates are slotted and two adjacent inner plates of the coupling of FIG. 1 are shown in FIG. 4 at 137 and 237. The adjacent outer plates are indicated at 135 and 235. Each of the inner plates is provided with a plurality of slots some of which are indicated in FIGS. 3 and 4 at 42 for the slots in the plate 137 and 43 for the slots in plate 237. It will be seen from FIGS. 3 and 4 that the slots 42 in the plate 137 are out of alignment with the slots 43 in the plate 237.

It will also be noted that each of the slots has a rounded edge indicated for the slot 43 in FIG. 4 at 44. Thus each slot is defined by sides, indicated at 45 for the slot 43 which converge in a direction of the arrow A. Similarly, the sides 46 of the slot 42 converge in the direction of the arrow B. Thus taking the pair of plates 137 and 237 together, the slots in each of the plates converge in a direction away from the radial face of the plate which is adjacent to the other plate of the pair. Thus for the plate 137 the sides 46 converge away from the radial surface 47 which is adjacent to the plate 237 and the walls 45 of the slot 43 in the plate 237 converge away from the radial surface 48 which is adjacent to the plate 137.

When there is relative movement between the slotted plates and the viscous liquid in the housing a lateral force is exerted on each of the slotted plates as will be described in relation to FIG. 5. This figure shows the plate 137 having the aperture 42 defined by sides 46 which, leading from the radial face 47 have rounded portions 49 similar to the portions 44 on the plate 237 described above.

As the plate rotates relative to the viscous oil in the housing there will be a force indicated by the arrow 50 which will be normal to the rounded portion 49 and may be resolved into a force 51 in the plane of the plate and a force 52 perpendicular thereto. It follows that when there is relative rotation between the hub and the housing, the forces such as 52 will tend to move the plates 137 and 237 against the plates 135 and 235 respectively thus widening the gap 53 between the plates 137 and 237. The forces 52 are resisted by the surface tension of the liquid between adjacent plates but, as hump mode approaches and the pressure in the coupling increases, the surface tension is overcome and the forces 52 assist in moving the plates 137 and 237 apart.

The apertures in the plates serve to allow the viscous liquid between each inner and outer plate to escape into the gap 53 so that there can be good frictional contact between the inner and outer plates in the hump mode.

As the plates 137, 237 move apart, there is an increase of pressure in the gap 53 which assists in moving the plates into contact with the plates 135 and 235. Moreover, since the slots 42 and 43 are out of alignment this increases the throttling effect between adjacent plates and also helps to increase the pressure thus assisting in the movement apart of the inner plates 137 and 237.

Figure 6:
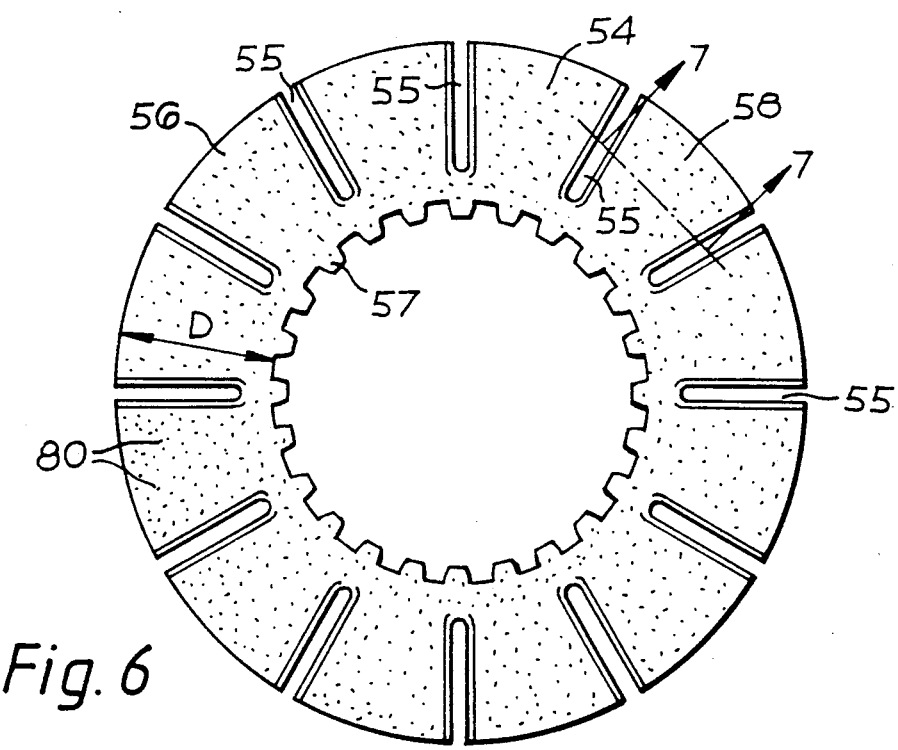
FIG. 6 is a view of another embodiment of plate.
Figure 7:
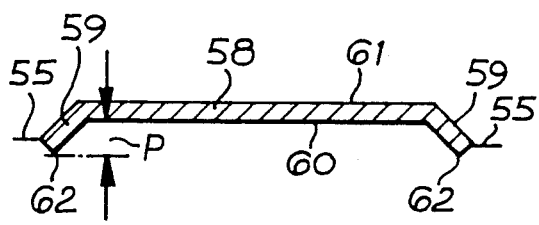
FIG. 7 is a section on the line 7—7 of FIG. 6.

A further form of plate is shown in FIGS. 6 and 7. A plate intended to be an inner plate is indicated at 54 and is provided with a plurality of radial slots 55 opening to its outer periphery 56. The inner periphery 57 of the plate is splined for mounting on the hub of the coupling. There is a radial dimension indicated by the arrow D between the inner and outer peripheries 57 and 56.

FIG. 7 is a section on the line 7—7 of FIG. 6 and this shows a land 58 between two adjacent slots 55. The slots 55 are defined in the radial dimension D by portions 59 which have been bent out of the general plane of the plate to project from one of the radial faces 60 of the plate by a distance P. This distance P is advantageously between 10% and 30% of the spacing between adjacent plates in the coupling when the plates of each pair of adjacent plates are spaced apart by an equal distance.

The portions 59 define the sides of the slots 55 and it will be seen that the sides converge away from the radial surface 61 of the plate. The portions 59 also produce sharp edges 62 which, as will be described, engage the outer plates and wipe off the silicone oil as the plates approach in hump mode.

Figure 8:
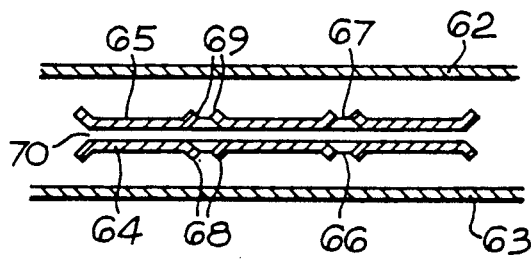
FIG. 8 is a diagram illustrating the relative positions of plates of the type shown in FIG. 6 in a coupling when operating in viscous mode.
Figure 9:
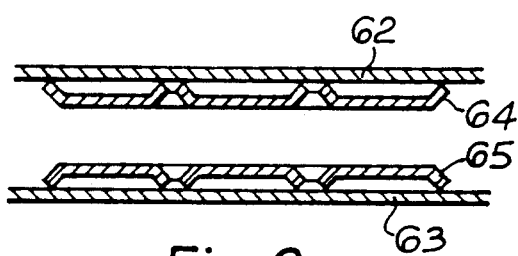
FIG. 9 is a view similar to FIG. 8 but showing the position of the plates when the coupling is operating in hump mode.

FIGS. 8 and 9 show an arrangement using plates similar to those shown in FIGS. 6 and 7; thus two outer plates are indicated at 62 and 63 and two inner plates at 64 and 65. It will be noted that there is a pair of inner plates 64 and 65 between an adjacent pair of outer plates 62 and 63. The inner plates 64 and 65 have slots indicated at 66 and 67 respectively and it will be noted that these slots are in alignment. The slots are defined by bent portions such as 59 in FIG. 7 and some of these bent portions are indicated at 68 for the plate 64 and at 69 for the plate 65. There is a gap 70 between the plates 64 and 65 in FIG. 8 which shows the plates in their positions for torque transmission in viscous mode. As the plates 64 and 65 move outwardly as hump mode is approached then the bent side portions 68, 69 engage the outer plates 63 and 62 as shown in FIG. 9 and the sharp edges scrape the oil off the faces of the planar outer plates 62 and 63.

Figure 10:
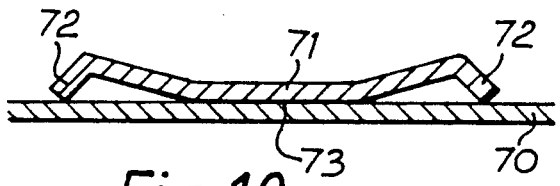
FIG. 10 is an enlarged detail showing the deformation of one of the plates in hump mode.

FIG. 10 shows how a land such as 58 in FIG. 7 may be deformed when the plates are in hump mode. Thus a planar outer plate is shown at 70 and a land between two slots of an inner plate is shown at 71. It will be noted that the land of the outer plate has been deformed between the bent portions 72 which define the slots so that it engages the planar plate at 73. This engagement helps to seal the space between each land 71 and the planar plate 70 and helps to give good frictional contact between the plates.

There will also be a hydro-dynamic effect as described in relation to FIG. 5 in the plates shown in FIGS. 6 and 7 since there will be a force on the bent portions 59, 68 and 69 which tend to move the plates such as 64 and 65 apart. It will be noted that the bent portions 68 and 69 of the plates 64 and 65 converge away from the radial face of the adjacent plate of the pair. Thus the portions 69 converge away from the adjacent radial face of the plate 64 and the portions 68 converge away from the adjacent radial face of the plate 65.

Figure 11:
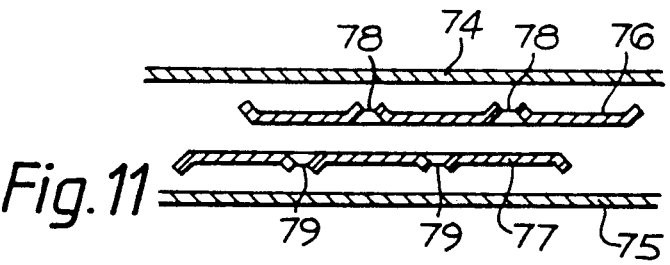
FIG. 11 is a diagram similar to FIG. 8 but showing a different arrangement of plates.

In FIGS. 8 and 9, the slots in the inner plates are in alignment but in FIG. 11 a further arrangement is shown where the slots in the inner plates are not aligned. Thus two outer plates are shown at 74 and 75 between which is a pair of inner plates 76 and 77. The plate 76 has slots 78 and the plate 77 has slots 79 and it will be noticed that the slots 78 are out of alignment with the slots 79. The slots are formed by bent portions as described in relation to FIGS. 6 and 7 and the operation of the coupling is otherwise as described above.

The plates as described in relation to FIGS. 7 to 11 are provided with a wear resistant coating indicated in FIG. 6 at 80. This is preferably a nitride or carbonitride coating and the plates are subjected to a nitriding process and subsequently to a tempering operation.

Figure 12:
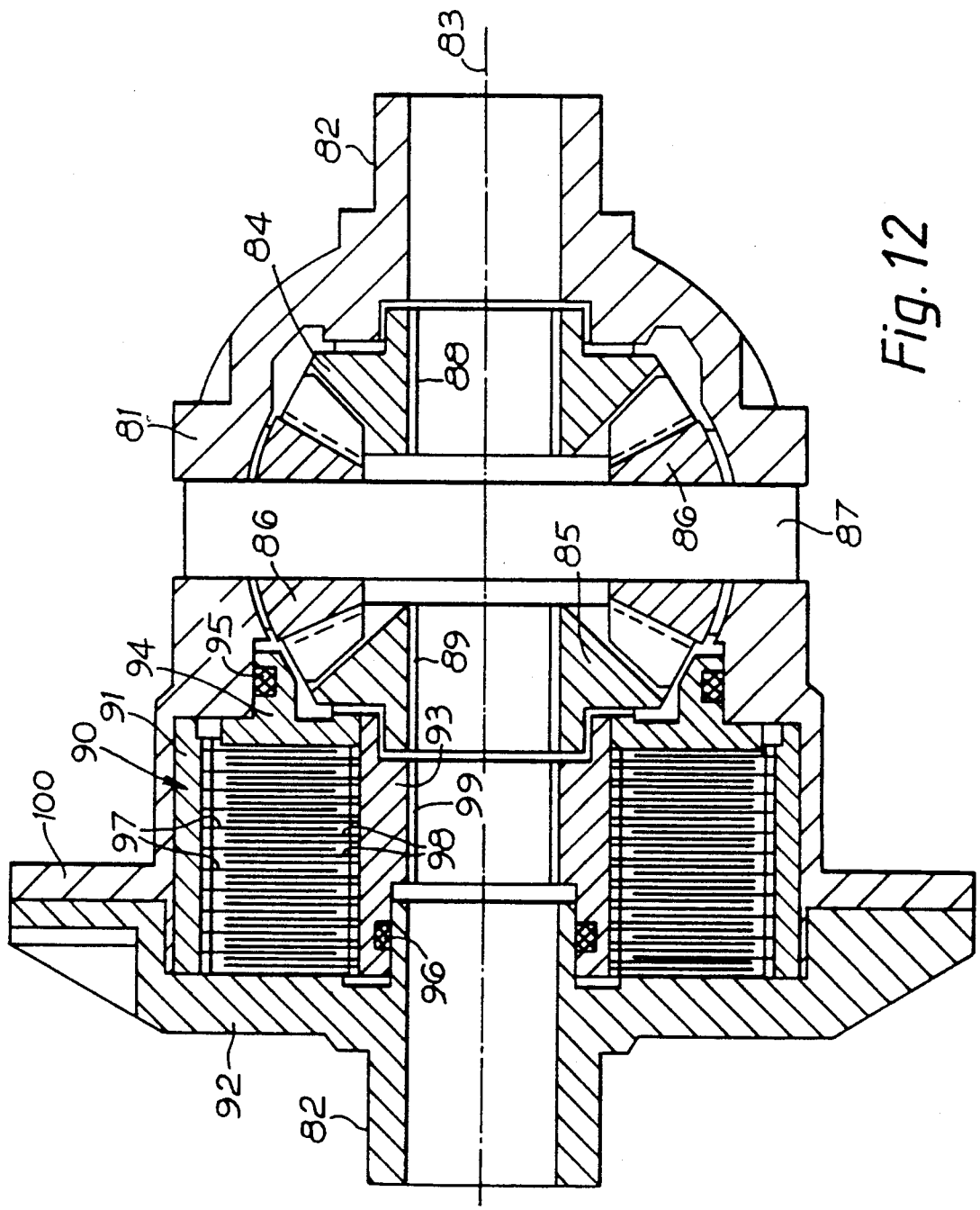
FIG. 12 is a section through a coupling embodying the invention associated with a differential gear.

FIG. 12 shows a coupling embodying the invention in combination with a differential gear.

Referring to FIG. 12, the assembly comprises a differential carrier 81 which is provided with bearing spigots 82 whereby it may be mounted in a casing for rotation about an axis 83. Two side gears 84 and 85 are rotatably mounted in the carrier and mesh with planet gears 86 mounted on a planet pin 87. The side gear 84 is internally splined at 88 and the side gear 85 is internally splined at 89. Also mounted within the carrier is a viscous coupling indicated generally at 90 and comprising an internally splined cylindrical casing 91. This is closed at one end by a wall 92 of a carrier. The coupling also includes an externally splined hub 93 and an end member 94 connected to the hub. The end member is sealed at 95 to the carrier and the hub is sealed at 96 to the carrier. There is a set of outer plates, some of which are indicated at 97 which are splined to the housing and between each adjacent pair of outer plates 97 there is a pair of inner plates 98 which are splined to the hub. The hub is internally splined at 99. The splines 99 in the hub are aligned with the splines 89 in the side gear 85 so that the hub and the side gear may be connected by a drive shaft (not shown) having a splined end which engages both splines 89 and 99. The splines of the side gear 88 will also be engaged by a drive shaft. Thus the input to the assembly will be by a crown wheel, not shown, connected to a flange 100 on the carrier and the outputs will be from the drive shafts engaging the side gears. It will be seen that the viscous coupling is connected between the two side gears 84 and 85 to control the differential action therebetween. Thus if there is relative rotation between the side gears there will be relative rotation between the carrier and the hub 93 of the viscous shear coupling and the viscous liquid in the coupling will be sheared. The inner plates will tend to move apart as described above and may be of either of the constructions described above. When the coupling is in hump mode there will be a friction clutch between the side gears and therefore differential action will be restricted to enable a vehicle to overcome a situation where there may be slip between the two wheels connected to the coupling.

Figure 13:
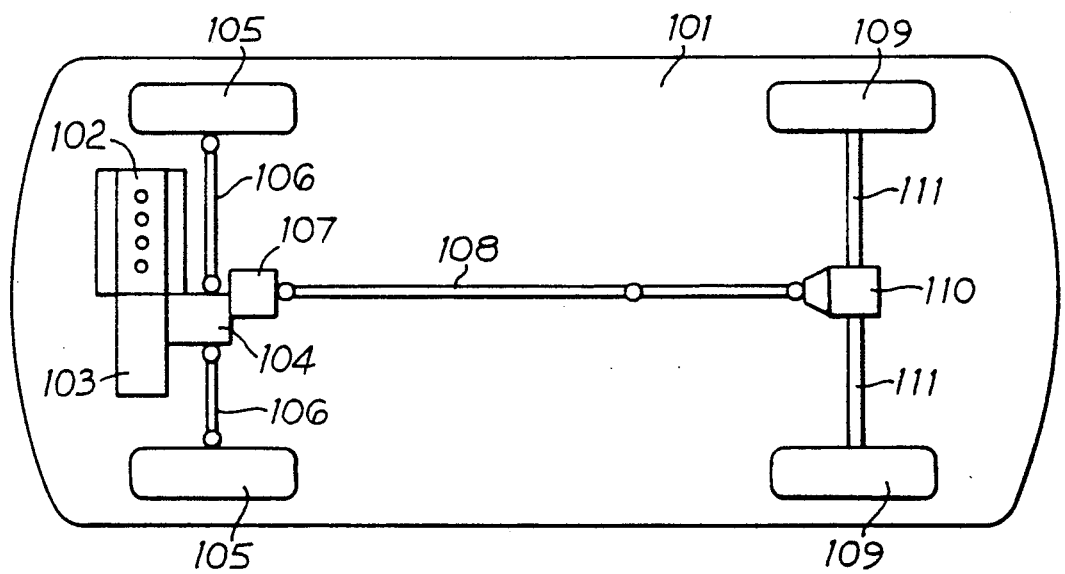
FIGS. 13 and 14 are diagrams illustrating the application of couplings embodying the invention to motor vehicles.

FIG. 13 shows how the coupling may be applied to a motor vehicle. The vehicle is indicated at 101 and has a prime mover 102 which drives a gear box 103 which in turn drives an inter-wheel differential gear 104. This drives road wheels 105 by drive shafts 106. An inter-axle differential gear 107 is also driven from the engine 103 and in turn drives a drive shaft 108 which drives rear wheels 109 via an inter-wheel differential gear 110 and drive shafts 111.

Any one or more of the differential gears 104, 107 and 110 may be of the construction described in relation to FIG. 12. It would also be possible to replace the differential 107 by a coupling such as shown in FIGS. 1 and 2 with the hub of the coupling being driven from the prime mover and the housing being connected to the shaft 108.

Figure 14:
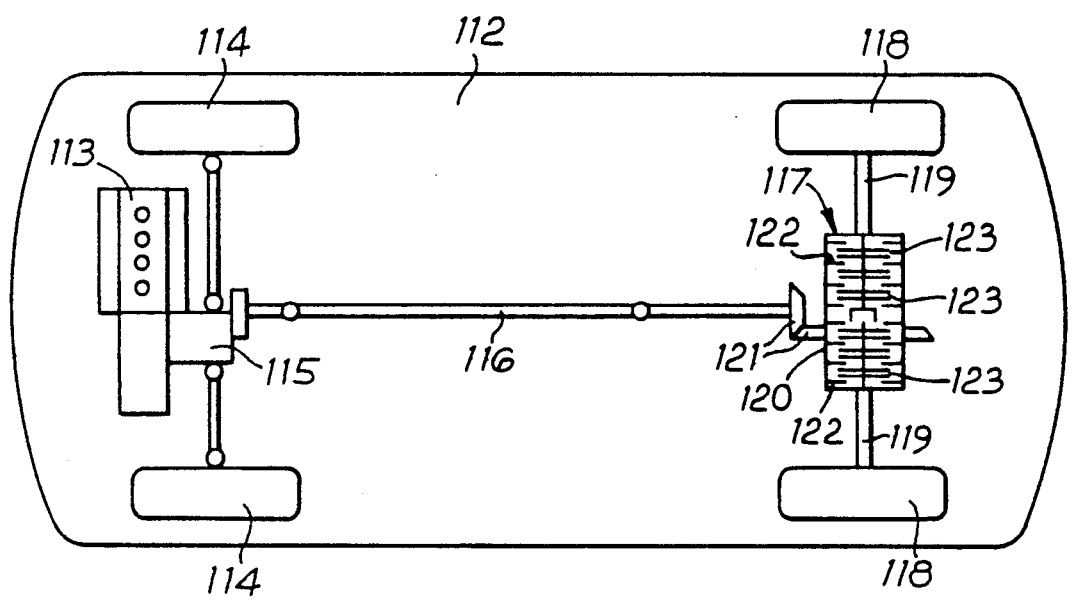

FIG. 14 shows a further arrangement of a vehicle 112 having a prime mover 113 and front wheels 114 driven via a inter-wheel differential gear 115. A propeller shaft 116 is driven from the differential 115 and drives a torque splitting coupling indicated at 117 which drives the rear wheels 118 by drive shafts 119.

A torque splitting coupling is described in European Patent Specification No. B 0 068 309 but essentially comprises a housing 120 which is driven from the shaft 115 by a crown wheel and pinion device 121. The housing 120 has a first set of plates 122 splined thereto. Each of the drive shafts 119 has a hub 119a within the housing with one group of a set of plates splined thereto. These plates are indicated at 123 and are interleaved with the plates 122. The arrangement is such that the plates 123 are arranged in pairs with each pair of plates 123 being located between two adjacent plates 122 as described in relation to FIG. 1. Alternatively a pair of plates 122 may be located between each two adjacent plates 124. The plates which are arranged in pairs will be of the configuration shown in FIG. 4 or in FIGS. 6 and 7 and in the latter case the plates of the other set or sets will be planar.

The torque splitting coupling combines the functions of the inter-axle differential 107 and the inter-wheel differential 110 in the arrangement shown in FIG. 13. Moreover it has the above described advantages due to the plate arrangement and the convergent slot sides.

It will be seen that the invention provides a viscous shear coupling in which distortion of the plates is avoided and improved torque transmission is obtained in the hump mode. The coupling is particularly useful in association with a differential gear as described in relation to FIG. 12 and in vehicle drive lines as describe in relation to FIGS. 13 and 14.

We claim:

1. A viscous shear coupling comprising; a housing forming a first coupling part, a hub mounted within the housing for rotation relative to the housing about an axis and forming a second coupling part, a viscous liquid in the housing, two sets of annular plates in the housing, each plate having an inner and an outer periphery, each plate being bounded by radial faces and having a radial dimension defined between said peripheries, the plates of the two sets being mounted on and rotatable with the housing and with the hub respectively, and being interleaved so that a pair of plates of one of said sets is located between each two adjacent plates of the other of said sets, each plate of said one set being axially movable independently of the other plates of the set with respect to the coupling part on which they are mounted and each having apertures therein opening into said radial faces and defined at least partly by sides which extend across said radial dimension and converge in a direction away from that radial face of the plate which is adjacent to the other plate of the said pair.

2. A coupling according to claim 1, wherein the adjacent plates of said other set are spaced apart by spacer rings.

3. A coupling according to claim 1, wherein the plates of said one set are those plates that are mounted on the hub.

4. A coupling according to claim 1, wherein said sides of said apertures are bevelled or rounded at one of said radial faces only.

5. A coupling according to claim 1, wherein said sides are formed by portions of the plate alongside the apertures which have been bent to project from a radial face of the plate and the radial faces of the plates of said other set which are juxtaposed to said projecting portions are planar.

6. A coupling according to claim 5, wherein the extent of the projection of said projecting portions from said radial face is between 10% and 30% of the spacing between adjacent plates when the spacing between each pair of adjacent plates in the housing is equal.

7. A coupling according to claim 1, wherein said through apertures are in the form of circumferentially spaced slots.

8. A coupling according to claim 1, wherein the apertures in the respective plates of each pair, when viewed parallel to said axis, are mutually offset and out of alignment.

9. A coupling according to claim 1, wherein the apertures in the respective plates of each pair, when viewed parallel to said axis, are mutually aligned.

10. A coupling according to claim 1, wherein the plates have a wear-resistant coating on their radial faces.

11. A coupling according to claim 10, wherein said coating is a nitride or carbonitride coating.

12. A viscous shear coupling according to claim 1, comprising two hub parts within said housing part, said hub parts being relatively rotatable about said axis; and wherein one of said sets of annular plates comprises two groups the plates of which are interleaved with the plates of the other set and one said group of said one set of plates being rotationally fast with one hub part while the other said group is rotationally fast with the other hub part.

13. A coupling according to claim 12, wherein the adjacent plates of said other set are spaced apart by spacer rings.

14. A coupling according to claim 12, wherein the plates of said one set are those plates that are mounted on the hubs.

15. A coupling according to claim 12, wherein said sides of said apertures are bevelled or rounded at one of said radial faces only.

16. A coupling according to claim 12, wherein said sides are formed by portions of the plate alongside the apertures which have been bent to project from a radial face of the plate and the radial faces of the plates of said other set which are juxtaposed to said projecting portions are planar.

17. A motor vehicle comprising a prime mover, road wheels, a drive line between the prime mover and some of the road wheels to drive the latter from the prime mover, the drive line comprising two parts which are interconnected by a viscous shear coupling comprising; a housing forming a first coupling part and connected to one part of the drive line, a hub mounted within the housing for rotation relative to the housing about an axis and forming a second coupling part which is connected to the other part of the drive line, a viscous liquid in the housing, two sets of annular plates in the housing, each plate having an inner and an outer periphery, each plate being bounded by radial faces and having a radial dimension defined between said peripheries, the plates of the two sets being mounted on and rotatable with the housing and with the hub respectively, and being interleaved so that a pair of plates of one of said sets is located between each two adjacent plates of the other of said sets, each plate of said one set being axially movable independently of the other plates of the set with respect to the coupling part on which they are mounted and each having apertures therein opening into said radial faces and defined at least partly by sides which extend across said radial dimension and converge in a direction away from that radial face of the plate which is adjacent to the other plate of the said pair.

18. The combination of a differential gear which comprises three interconnected gearing elements and a viscous shear coupling comprising; a housing forming a first coupling part and connected to one element of the differential gear, a hub mounted within the housing for rotation relative to the housing about an axis and forming a second coupling part and connected to another element of the differential gear, a viscous liquid in the housing, two sets of annular plates in the housing, each plate having an inner and an outer periphery, each plate being founded by radial faces and having a radial dimension defined between said peripheries, the plates of the two sets being mounted on and rotatable with the housing and with the hub respectively, and being interleaved so that a pair of plates of one of said sets is located between each two adjacent plates of the other of said sets, each plate of said one set being axially movable independently of the other plates of the set with respect to the coupling part on which they are mounted and each having apertures therein opening into said radial faces and defined at least partly by sides which extend across said radial dimension and converge in a direction away from that radial face of the plate which is adjacent to the other plate of the said pair.

19. A motor vehicle comprising a prime mover, road wheels, a drive line between the primer mover and some of the road wheels to drive the latter from the prime mover, the drive line comprising three parts which are interconnected by a differential gear which comprises three interconnected gearing elements each connected to a respective part of the drive line, and a viscous shear coupling comprising; a housing forming a first coupling part and connected to one element of the differential gear, a hub mounted within the housing for rotation relative to the housing about an axis and forming a second coupling part and connected to another element of the differential gear, a viscous liquid in the housing, two sets of annular plates in the housing, each plate having an inner and an outer periphery, each plate being bounded by radial faces and having a radial dimension defined between said peripheries, the plates of the two sets being mounted on and rotatable with the housing and with the hub respectively, and being interleaved so that a pair of plates of one of said sets is located between each two adjacent plates of the other of said sets, each plate of said one set being axially movable independently of the other plates of the set with respect to the coupling part on which they are mounted and each having apertures therein opening into said radial faces and defined at least partly by sides which extend across said radial dimension and converge in a direction away from that radial face of the plate which is adjacent to the other plate of the said pair.

20. A motor vehicle comprising a prime mover, road wheels, a first drive line between the prime mover and a first pair of road wheels, a second drive line between the prime mover and a second pair of road wheels, said second drive line including a viscous shear coupling comprising a housing connected to the second drive line and forming a first coupling part, first and second hubs mounted within the housing for rotation relative to the housing about an axis and forming second and third coupling parts connected respectively to the road wheels of said second pair, a viscous liquid in the housing, two sets of annular plates in the housing, each plate having an inner and an outer periphery, each plate being bounded by radial faces and having a radial dimension defined between said peripheries, the plates of the two sets being mounted on and rotatable with the housing and with the hubs respectively, the plates of the set mounted on the hubs comprising two groups, one said group being mounted on one of said hubs and the other said group being mounted on the other of said hubs, the plates of the two sets being interleaved so that a pair of plates of one of said sets is located between each two adjacent plates of the other of said sets, each plate of said one set being axially movable independently of the other plates of the set with respect to the coupling part on which they are mounted and each having apertures therein opening into said radial faces and defined at least partly by sides which extend across said radial dimension and converge in a direction away from that radial face of the plate which is adjacent to the other plate of the said pair.

* * * * *